United States Patent
Itoh et al.

(10) Patent No.: US 6,610,786 B1
(45) Date of Patent: Aug. 26, 2003

(54) THERMOPLASTIC ELASTOMER AND PROCESS FOR PRODUCING IT

(75) Inventors: Yuichi Itoh, Ichihara (JP); Akira Uchiyama, Ichihara (JP)

(73) Assignee: Mitsui Chemicals Inc, Tokyo (JP)

( * ) Notice: Subject to any disclaimer, the term of this patent is extended or adjusted under 35 U.S.C. 154(b) by 0 days.

(21) Appl. No.: 09/162,168

(22) Filed: Sep. 29, 1998

(30) Foreign Application Priority Data

Sep. 30, 1997 (JP) .............................................. 9-266843
Oct. 24, 1997 (JP) .............................................. 9-292271
Apr. 17, 1998 (JP) ............................................ 10-107196

(51) Int. Cl.$^7$ ........................... C08F 8/00; C08L 33/00; C08L 35/00
(52) U.S. Cl. ........................ 525/191; 525/192; 525/194; 525/197; 525/198; 525/217; 525/232; 525/240; 525/241
(58) Field of Search .................................. 525/191, 192, 525/194, 197, 198, 217, 232, 240, 241

(56) References Cited

U.S. PATENT DOCUMENTS

| | | | |
|---|---|---|---|
| 4,454,092 A | 6/1984 | Shimizu et al. | |
| 5,552,482 A | 9/1996 | Berta | 528/88 |
| 5,972,492 A * | 10/1999 | Murakami et al. | 428/318.8 |

FOREIGN PATENT DOCUMENTS

| | | |
|---|---|---|
| GB | 2007683 A | 5/1979 |

* cited by examiner

*Primary Examiner*—Nathan M. Nutter

(57) ABSTRACT

A thermoplastic elastomer exhibiting scarce tendency of depositing gummy crust around the extrusion die upon extrusion molding articles therefrom and a superior oil-resistance, which comprises (A) a crystalline polyolefin resin and (B) a cross-linked rubber component produced by a specific melt-kneading technique and which has a certain high level of gel content, a high oil-resistance and a certain reduced rate of deposition of gummy crust on the extrusion die.

12 Claims, 2 Drawing Sheets

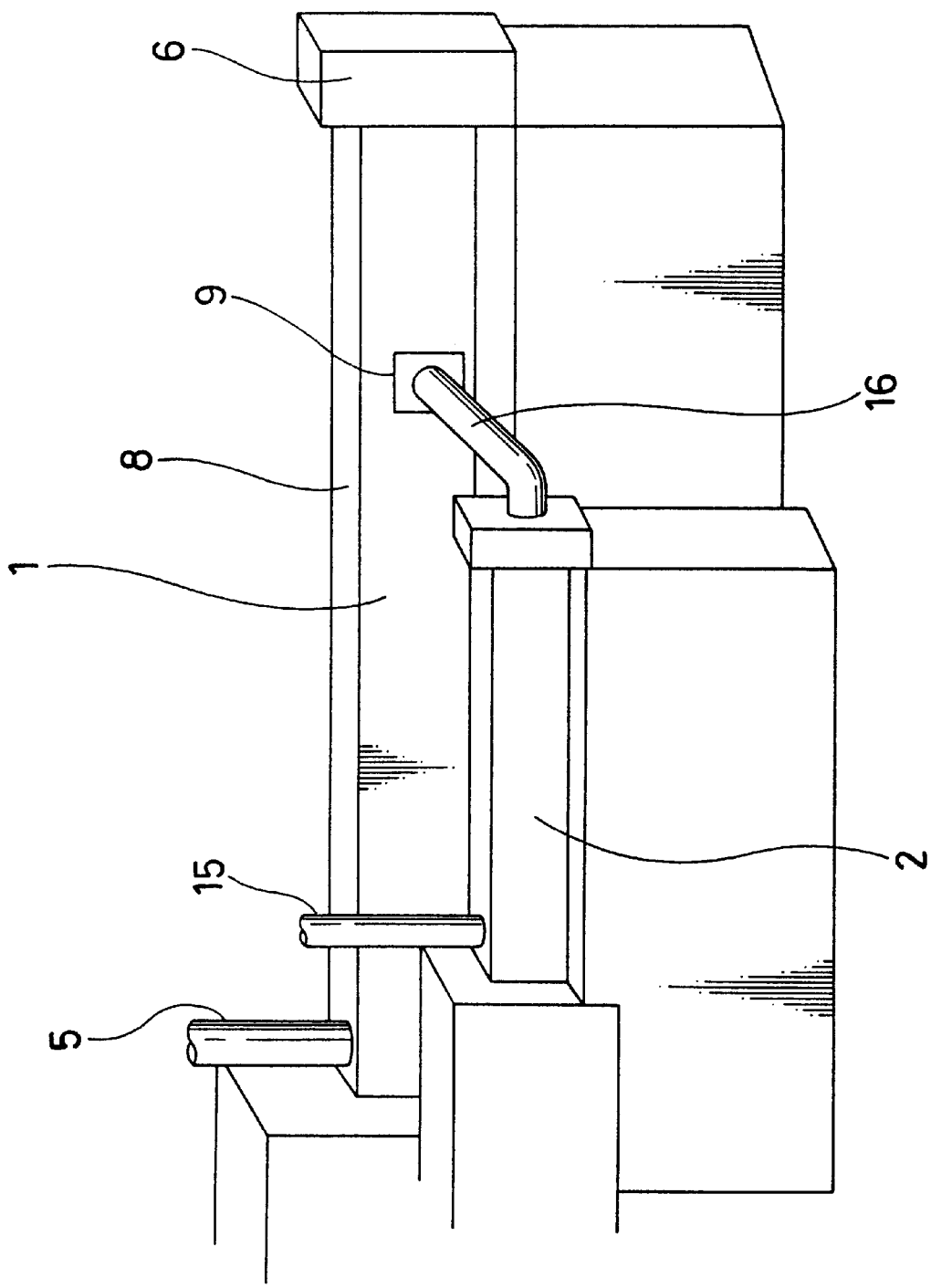

THERMOPLASTIC ELASTOMER AND PROCESS FOR PRODUCING IT

FIELD OF THE INVENTION

The present invention relates to a thermoplastic elastomer comprising a crystalline polyolefin resin and a cross-linked rubber component as well as to a process for producing such thermoplastic elastomer. More specifically, the invention relates to a thermoplastic elastomer exhibiting improved resistance to oils together with almost no tendency to deposit gummy crust onto surfaces of an extrusion die upon extrusion molding of articles therefrom and to a process for producing such thermoplastic elastomer.

BACKGROUND OF THE INVENTION

Due to light weight and ease in recycling, thermoplastic elastomers based on polyolefin have found wide applications for use as energy-sparing and resources-sparing elastomers, in particular, as substitute for vulcanized rubber for parts and elements in a variety of applications such as automobiles, industrial machines and electric and electronic devices, and for architectural materials.

However, thermoplastic polyolefinic elastomers of the prior art are inferior in the resistance to oils and, in particular, suffer from a problem that they may swell upon contact with non-polar solvents, such as aromatic organic solvents, gasoline and mineral oils, resulting in limitation of the application range. The conventional thermoplastic elastomers exhibit more tendency to cause deposition of gummy crust at and around the extrusion die upon extrusion molding of such elastomers into articles than other commonly employed resins, whereby the molded articles may suffer from deterioration of appearance due to adhesion of the separated gummy crust.

SUMMARY OF THE INVENTION

An object of the present invention is to provide a thermoplastic elastomer based on polyolefin, which exhibits an improved resistance to oils and has scarce tendency to cause deposition of gummy crust onto extrusion die upon extrusion molding of articles therefrom.

Another object of the present invention is to provide a process for producing the above-mentioned improved thermoplastic elastomer based on polyolefin.

The above objects of the present invention are attained by the polyolefinic thermoplastic elastomer and the process for producing such elastomer as given below:

(1) A thermoplastic elastomer comprising (A) a crystalline polyolefin resin and (B) a cross-linked rubber component, which has
  a) a gel content expressed as a cyclohexane-insoluble matter after having been soaked in cyclohexane at 23° C. for 48 hours of at least 20% by weight,
  b) a weight change range $\Delta W$ after having been soaked in paraffin oil at 50° C. for 24 hours amounting to 80% by weight or lower and
  c) a rate of gummy crust deposition of 30 mg or less within an interval of 10 minutes occuring around the extrusion die upon extrusion of the elastomer into a ribbon on a monoaxial extruder provided with a full-flight extrusion screw having a diameter of 50 mm, an L/D ratio of 28 and a compression ratio of 4.0 through an extrusion die having an extrusion aperture of 25 mm×1 mm under a gradient temperature elevation from the extruder supply inlet to the die outlet of 160–210° C. at an extrusion rate of 20 m/min.

(2) A process for producing a thermoplastic elastomer comprising (A) a crystalline polyolefin resin and (B) a cross-linked rubber component, comprising the steps of
  melt-kneading a crystalline polyolefin resin ($A_1$) together with a rubber component ($B_1$) in the presence of a cross linking agent (D) in a first extruder,
  supplying the resulting kneaded mass in which the cross linking reaction has substantially been completed to a second extruder and
  melt-kneading the so-supplied kneaded mass therein together with a crystalline polyolefin resin ($A_2$) and/or a rubber component ($B_2$) each supplied to the second extruder.

(3) A process for producing a thermoplastic elastomer comprising (A) a crystalline polyolefin resin and (B) a cross-linked rubber component, comprising the steps of
  melt-kneading a crystalline polyolefin resin ($A_1$) together with a rubber component ($B_1$) in the presence of a cross linking agent (D) in a first extruder,
  supplying a kneaded mass of a crystalline polyolefin resin ($A_2$) and/or a rubber component ($B_2$) extruded from a second extruder to the first extruder at a position within the range of the exit-side half of the first extruder and
  melt-kneading the so-supplied kneaded mass ($A_2$ and/or $B_2$) therein together with the kneaded mass which has been subjected to the melt-kneading in the first extruder and in which the cross linking reaction has substantially been completed.

BRIEF DESCRIPTION OF THE DRAWINGS

FIG. 3 is a perspective view of an apparatus for realizing the second process for producing the thermoplastic elastomer according to the present invention.

DETAILED DESCRIPTION OF THE INVENTION

Figure 1:
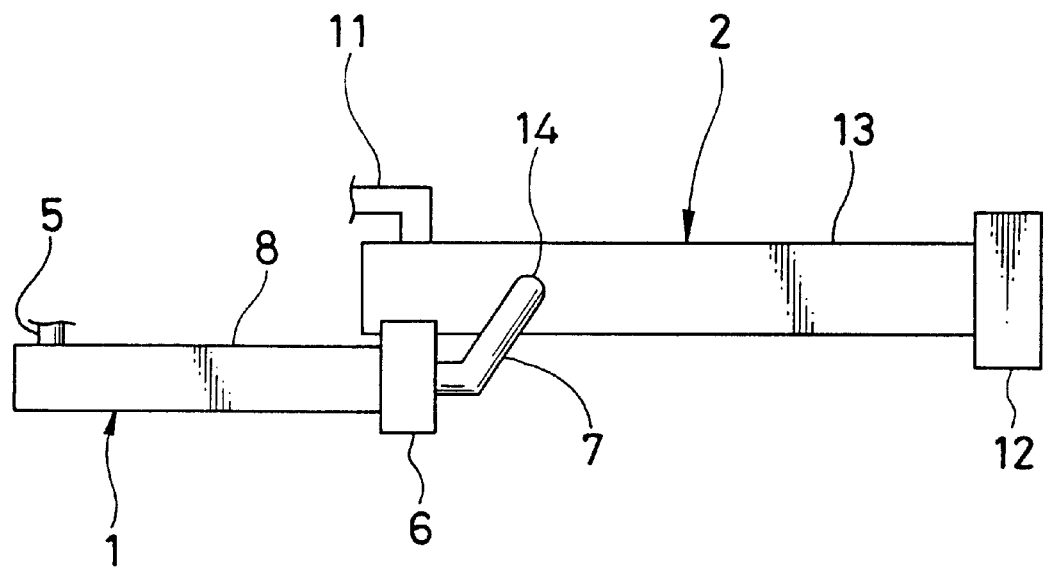
FIG. 1 is a perspective view of an apparatus for realizing the first process for producing the thermoplastic elastomer according to the present invention.

In the context of this specification, the word "gummy crust" means a deposit occuring and adhering on the extrusion die during extrusion molding of the thermoplastic elastomer into molded articles on an extrusion molding machine and exhibiting different color and material properties from the raw material to be molded. For the gummy crust, there are yellow sticky one and black particulate one, which are believed to be degradation products of the starting polymer, though the mechanism of formation thereof is unknown.

The thermoplastic elastomer according to the present invention comprises a crystalline polyolefin resin (A) and a cross-linked rubber component (B) and has a gel content a), as defined above, of at least 20% by weight, preferably at least 30% by weight, a weight change range $\Delta W$ b) before and after the soaking, as described above, of 80% by weight or less, preferably 60% by weight or less, and a gummy crust deposition rate c), as described above, of 30 mg or less, preferably 20 mg or less. The gel content a), the weight change range ΔW b) before and after soaking in paraffin oil and the gummy crust deposition rate c) are determined as follows:

(Method for Determining the Gel Content a), Namely, Cyclohexane-insoluble Matter)

About 100 mg of a sheet sample of thermoplastic elastomer are weighed precisely and the sheet is cut into grains of a size of 0.5 mm×0.5 mm×0.5 mm. The resulting grains are then soaked in 30 ml of cyclohexane in a closed vessel at a temperature of 23° C. for 48 hours. The granular sample after soaking is taken out of the vessel onto a filter paper and dried at room temperature over a period of 72 hours or more until a constant weight is reached. The weight value calculated by subtracting the weight of cyclohexane-insoluble matter other than that of the polymer components (namely, fibrous filler, filling materials, pigments and so on) from the weight of the dried sample is taken as the "corrected final weight (Y)". On the other hand, the weight value calculated by subtracting the sum of the weight of cyclohexane-soluble matter other than that of the polymer components (namely, for example, softening agent and so on) plus the weight of other cyclohexane-insoluble matter other than that of the polymer components (namely, fibrous filler, filling materials, pigments and so on) from the weight of the dried sample is taken as the "corrected original weight (X)".

Here, the gel content a), i.e. the proportion of cyclohexane-insoluble matter in the thermoplastic elastomer, can be calculated by the following equation (1):

$$\text{Gel content (wt. \%)} = \frac{\text{Correct. final weight } (Y)}{\text{Correct. original weight } (X)} \times 100 \quad (1)$$

(Method for Determining the Weight Change Range ΔW b) Before and After the Soaking)

A rectangular plate of a size of 150 mm×120 mm×2 mm is formed by injection molding from the thermoplastic elastomer, from which test pieces each in a form of square plate of a size of 20 mm×20 mm×2 mm are cut out. Each test piece which has been weighed preliminary is soaked in paraffin oil of 50° C. for 24 hours, whereupon the resulting soaked test piece is weighed again to determine the weight change range ΔW b) before and after the soaking.

(Method for the Determination of Gummy Crust Deposition Rate c)

Using a monoaxial extruder with a full-flight extrusion screw having a diameter of 50 mm, an L/D ratio of 28 and a compression ratio of 4.0 equipped with an extrusion die having an extrusion aperture of 25 mm×1 mm, the thermoplastic elastomer is extruded into a ribbon at an extrusion rate of 20 m/min. under a gradient temperature elevation from the extruder supply inlet to the die outlet of 160–210° C. The gummy crusts deposited around the extrusion die within an interval of 10 minutes during the extrusion are collected and weighed. Here, the above gradient temperature elevation is realized under the condition of the settled temperatures for the kneading zones C1 to C4 in the extrusion barrel, for the extruder head (H) and for the die (D), respectively, as follows:

Set temperature (° C.) for C1/C2/C3/C4/H/D=160/170/180/190/200/210

The thermoplastic elastomer according to the present invention is a resin composition comprising a crystalline polyolefin resin (A) and a cross-linked rubber component (B), wherein a composition containing, on the one hand, a cross-linked product (C) in which a rubber component ($B_1$) is cross-linked in a state mixed with a crystalline polyolefin resin ($A_1$) and, on the other hand, a crystalline polyolefin resin ($A_2$) and/or a rubber component ($B_2$) is preferred.

As the crystalline polyolefin resin ($A_1$) constituting the cross-linked product (C), there may be exemplified homopolymers and copolymers of α-olefins having 2–20 carbon atoms, preferably 2–10 carbon atoms, containing these principal components usually in an amount of at least 85 mole %, preferably at least 90 mole %, such as ethylene, propylene, 1-butene, 1-pentene, 1-hexene, 1-octene, 1-decene, 4-methyl-1-pentene and 3-methyl-1-pentene.

As the crystalline polyolefin resin ($A_1$), there may be exemplified favorably polyolefin resins of homopolymers of ethylene, propylene and 1-butene and copolymers constituted mainly of olefin comonomers, such as ethylene, propylene and 1-butene, wherein special preference is given to polypropylene. As the polypropylene, a propylene homopolymer or a copolymer of propylene having a propylene content in the range of 85–100 mole %, preferably in the range of 90–100 mole %, with other α-olefin comonomer than propylene having 2–10 carbon atoms. The crystalline polyolefin resin ($A_1$) constituting the cross-linked product (C) may consist of one single species of resin or of two or more species of polyolefin resins.

The crystalline polyolefin ($A_1$) constituting the cross-linked product (C) may favorably be those which have a melt flow rate (MFR, determined according to ASTM D 1238-65T at 230° C. under a load of 2.16 kg) in the range of 0.1–100 g/10 min., preferably of 0.3–50 g/10 min.

According to the present invention, the proportion of the crystalline polyolefin resin ($A_1$) constituting the cross-linked product (C) may favorably be in the range of 5–70 parts by weight, preferably 10–50 parts by weight, per 100 parts by weight of the sum of the components ($A_1$) and ($B_1$) constituting the cross-linked product (C).

When the content of the crystalline polyolefinic resin ($A_1$) is within the above range, the thermoplastic elastomer is superior in the elasticity and in moldability.

Concrete examples of the rubber component ($B_1$) constituting the cross-linked product (C) include olefinic copolymer rubbers which are elastic amorphous random copolymers having at least 50 mole % of an α-olefin of 2–20 carbon atoms, butadiene rubber, isoprene rubber, styrene/ethylene copolymer rubber, styrene/butadiene copolymer rubber and hydrogenation product thereof, styrene/isoprene copolymer rubber and hydrogenation product thereof, nitrile rubber, natural rubber, butyl rubber, polyisobutylene and acryl rubber.

As the α-olefin of 2–20 carbon atoms, there may be exemplified ethylene, propylene, 1-butene 4-methyl-1-pentene, 1-hexene and 1-octene. Among them, preference is given to ethylene and propylene.

For the rubber component ($B_1$), rubbers based on olefin, such as copolymers of two or more α-olefins having the principal constituents usually in a proportion of less than 85 mole %, preferably less than 82 mole %, and α-olefin/non-conjugated diene copolymers constituted of at least two α-olefins and a non-conjugated diene, may preferably be employed, in particular, ethylene/α-olefin/non-conjugated diene copolymer rubbers (with ethylene/α-olefin mole ratios in the range of about 90/10 to 50/50) are preferred. As the ethylene/α-olefin/non-conjugated diene copolymer rubber mentioned above, ethylene/propylene/non-conjugated diene copolymer rubbers are preferred.

For the non-conjugated diene, there may be enumerated, for example, dicyclopentadiene, 1,4-hexadiene, cyclooctadiene, methylene norbornene and ethylidene norbornene. The ethylene/α-olefin/non-conjugated diene copolymer rubber in which such a non-conjugated diene is employed as a comonomer may favorably have an iodine value of 35 or less, preferably 25 or less.

The rubber component ($B_1$) constituting the cross-linked product (C) may favorably have a melt flow rate (MFR) in the range of 0.1–5 g/10 min., preferably 0.1–2 g/10 min. (determined according to ASTM D 1238-65T, at 230° C. under a load of 2.16 kg).

The rubber component ($B_1$) constituting the cross-linked product (C) may be composed of one single polymer species or of two or more polymer species.

The proportion of the rubber component ($B_1$) constituting the cross-linked product (C) according to the present invention may favorably amount to 30–95 parts by weight, preferably 90–50 parts by weight, per 100 parts by weight of the sum of the components ($A_1$) and ($B_1$) constituting the cross-linked product (C). In such a proportion of the rubber component ($B_1$), the thermoplastic elastomer according to the present invention exhibits a high elasticity and a superior moldability.

For the cross-linked product (C) according to the present invention, a cross linking agent (D) used commonly in thermosetting rubbers may be employed, such as an organic peroxide, sulfur, phenol resin, amino resin, quinone and its derivative, amine compound, azo compound, epoxy compound or isocyanate. Among them, preference is given to organic peroxide.

Concrete examples of organic peroxide include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butylperoxyisopropyl carbonate, diacetyl peroxide, lauroyl peroxide and tert-butylcumyl peroxide.

Among them, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis-(tert-butylperoxy)-3,3,5-trimethylcyclohexane and n-butyl-4,4-bis(tert-butylperoxy)valerate are favorable in view of odor and stability to scorch. Preference is given especially to 1,3-bis(tert-butylperoxyisopropyl)benzene and 2,5-dimethyl-2,5-di(tert-butylperoxy)hexane.

The organic peroxide may favorably be employed in an amount in the range of 0.1–2 parts by weight, preferably 0.2–1.5 parts by weight, per 100 parts by weight of the sum of the components ($A_1$) and ($B_1$) constituting the cross-linked product (C). When the amount of the organic peroxide used is in the above range, the resulting thermoplastic elastomer will have properties well balanced among the rubbery elasticity, moldability, heat resistance and appearance of the molded article.

Upon the cross linking of the rubber component (B) using the organic peroxide, a cross linking assistant (E) may be used. Concrete examples of the cross linking assistant (E) include divinyl compounds, such as divinylbenzene and the like; oximes, such as p-quinone dioxime and p,p'-dibenzoylquinone dioxime; nitroso compounds, such as N-methyl-N-4-dinitrosoaniline and nitrosobenzene; maleimides, such as trimethylolpropane-N,N'-m-phenylenedimaleimide; and others, such as sulfur, diphenylguanidine and so on. Other compounds may also be used for the cross linking assistant (E), for example, polyfunctional methacrylate monomers, such as ethylene glycol dimethacrylate, diethylene glycol dimethacrylate, polyethylene glycol dimethacrylate, trimethylolpropane trimethacrylate and allyl methacrylate; polyfunctional vinyl monomers, such as vinyl butyrate and vinyl stearate; and polyfunctional allyl monomers, such as triallyl cyanurate and so on.

By performing the cross linking reaction using the organic peroxide in the presence of a cross linking assistant (E) mentioned above, a uniform and mild cross linking reaction may be expected. Among the above-indicated cross linking assistants (E), divinylbenzene is the most preferred. Divinylbenzene is easy in handling, exhibits a better compatibility with the crystalline polyolefin resin ($A_1$) and with the rubber component ($B_1$) and acts as a dispersing agent for the iorganic peroxide to solubilize the organic peroxide, so go that a uniform cross linking can be realized by the heat treatment, whereby a thermoplastic elastomer having a better balance between the flowability and the material properties can be obtained.

It is favorable to use the cross linking assistant (E) in an amount in the range of 0.1–3%, preferably 0.2–2%, based on the weight of the entire mass to be subjected to cross linking treatment. In case the amount of the cross linking assistant (E) blended in the starting composition to be subjected to cross linking treatment is in the above range, the resulting thermoplastic elastomer will not suffer from alteration in the material properties upon molding thereof due to thermal hysteresis, since no remainder of the cross linking assistant (E) as unreacted monomer is present in the thermoplastic elastomer, and, in addition, the resulting thermoplastic elastomer exhibits a superior flowability.

The crystalline polyolefin resin ($A_2$) to be blended with the cross-linked product (C) may either be identical with or different from the crystalline polyolefin resin ($A_1$) constituting the cross-linked product (C). Thus, those exemplified previously for the crystalline polyolefin resin ($A_1$) can be employed for the crystalline polyolefin resin ($A_2$). The crystalline polyolefin resin ($A_2$) may consist of one single polymer species or of two or more polymer species.

As the crystalline polyolefin resin ($A_2$) to be blended with the cross-linked product (C), polypropylene or a low density linear polyethylene is preferred, wherein a particular preference is given to a polypropylene having an MFR of 10 g/10 min. or lower. By using such a polypropylene product, a thermoplastic elastomer which causes scarce occurrence of deposition of gummy crust upon extrusion molding thereof and which exhibits an increased oil-resistance can be obtained.

The rubber component ($B_2$) to be blended with the cross-linked product (C) may be identical with or different from the rubber component ($B_1$) constituting the cross-linked product (C). Thus, those exemplified previously for the rubber component ($B_1$) can be used as the rubber component ($B_2$). The rubber component ($B_2$) to be blended with the cross-linked product (C) may consist of one single polymer species or of two or more polymer species.

As the rubber component ($B_2$) to be blended with the cross-linked product (C), it is preferable to use a rubber which is the same as the rubber component ($B_1$) constituting the cross-linked product (C) or is well compatible therewith and/or an olefinic rubber which is an amorphous random elastic copolymer having a content of an α-olefin of 2–20 carbon atoms of at least 50 mole %. As the amorphous random elastic copolymer, there may be enumerated α-olefin copolymers composed of two or more α-olefins and α-olefin/non-conjugated adiene copolymers composed of two or more α-olefins and a non-conjugated diene. Concrete examples for such an amorphous random elastic copolymer include:

1) Ethylene/α-olefin copolymer rubbers with mole ratios of ethylene/α-olefin in the range of about 90/10–50/50
2) Ethylene/α-olefin/non-conjugated diene copolymer rubbers with mole ratios of ethylene/α-olefin in the range of about 90/10–50/50
3) Propylene/α-olefin copolymer rubbers with mole ratios of propylene/α-olefin in the range of about 90/10–50/50
4) Butene/α-olefin copolymer rubbers with mole ratios in the range of about 90/10–50/50

As the above-mentioned α-olefin, there may be exemplified ethylene, propylene, 1-butene, 4-methyl-1-pentene, 1-hexene and 1-octene.

As the non-conjugated diene mentioned above, there may be exemplified dicyclopentadiene, 1,4-hexadiene, cyclooctadiene, methylenenorbornene and ethylidenenorbornene.

The ethylene/α-olefin/non-conjugated diene copolymer rubber given in above 2) in which a non-conjugated diene such as given above is copolymerized may preferably have an iodine value of 25 or lower. For the olefinic rubbers given in above 1) to 4), those which have an MFR in the range of 0.1–10 g/10 min., preferably 0.2–5 g/10 min., are preferred.

Among the olefinic rubbers mentioned above, special preference is given to ethylene/propylene copolymer rubbers and, in particular, those in which the ethylene/propylene mole ratio is in the range of 30/70–90/10 are preferred.

The amount of the crystalline polyolefin resin ($A_2$) and/or the rubber component ($B_2$) to be incorporated in the cross-linked product (C) according to the present invention may favorably be in the range of 3–100 parts by weight, preferably 5–70 parts by weight, per 100 parts by weight of the sum of ($A_1$) and ($B_1$) constituting the cross-linked product (C). Either one or both of the crystalline polyolefinic resin ($A_2$) and the rubber component ($B_2$) may be incorporated in the cross-linked product (C).

In the thermoplastic elastomer composition according to the present invention, other ingredients than the crystalline polyolefin resin ($A_2$) and the rubber component ($B_2$) may be incorporated, such as softening agent (F), inorganic filler (G) and so on, as starting ingredients for the thermoplastic elastomer. When, in particular, a softening agent (F) is employed, a thermoplastic elastomer exhibiting higher elasticity and superior moldability can be obtained.

Concrete examples of the softening agent (F) include petroleum products, such as process oils, lubricating oils, paraffin, liquid paraffin, polyethylene wax, polypropylene wax, petroleum asphalt and Vaseline; coal tar materials, such as coal tar and coal tar pitch; fatty oils, such as castor oil, linseed oil, rapeseed oil, soybean oil and coconut oil; waxes, such as tall oil, carnauba wax and lanolin; fatty acids, such as ricinoleic acid, palmitic acid, stearic acid, 12-hydroxystearic acid, montanic acid, oleic acid and erucic acid and metal salts of them; synthetic high molecular substances, such as petroleum resin, cumarone-indene resin and atactic polypropylene; plasticizers based on ester, such as dioctyl phthalate, dioctyl adipate and dioctyl sebaate; and others, such as microcrystalline wax, liquid polybutadiene and modification and hydrogenation products-thereof.

The amount of the softening agent (F) to be incorporated in the elastomer composition according to the present invention may favorably be in the range of 10–300 parts by weight, preferably 20–200 parts by weight, per 100 parts by weight of the rubber component (B).

Concrete examples of the inorganic filler (G) include glass fiber, potassium titanate fiber, carbon fiber, calcium carbonate, calcium silicate, clays, kaolin, talc, silica, diatomaceous earth, powdery mica, asbestos, alumina, barium sulfate, aluminum sulfate, calcium sulfate, magnesium carbonate, molybdenum disulfide, graphite, glass beads and Shirasu balloons.

The amount of the inorganic filler (G) to be incorporated in the elastomer composition according to the present invention may favorably be in the range of 1–100 parts by weight, preferably 2–50 parts by weight, per 100 parts by weight of the sum of the crystalline polyolefin resin (A) and the rubber component (B).

The thermoplastic elatomer according to the present invention may contain, if necessary, various additives, such as thermal stabilizer, antioxidant, anti-weathering agent, antistatic agent, colorant and lubricant, in an amount not obstructing the object of the invention.

The thermoplastic elastomer according to the present invention is a resin composition comprising a cross-linked product (C) in which the rubber component ($B_1$) in a state mixed with the crystalline polyolefin resin ($A_1$) is cross-linked, a further crystalline polyolefin resin ($A_2$) and/or a further rubber component ($B_2$) as well as optional additives. The cross-linked product (C) is present in the elastomer composition in a form of gelled product having cross-linked rubber component ($B_1$) and embracing the crystalline polyolefin resin ($A_1$) and contains a gelled component which is insoluble in cyclohexane at 23° C. The crystalline polyolefin resins ($A_1$, $A_2$) and other constituents and ingredients are uniformly dispersed in the body of the cross-linked product (C) as a uniform mixture.

The thermoplastic elastomer according to the present invention can be obtained either by the first process, which comprises the steps of melt-kneading the crystalline polyolefin resin ($A_1$) together with the rubber component ($B_1$) in a first extruder in the presence of the cross linking agent (D), supplying the resulting kneaded mass in which the cross linking reaction has substantially been completed to a second extruder and melt-kneading the so-supplied kneaded mass therein together with the crystalline polyolefin resin ($A_2$) and/or the rubber component ($B_2$) each supplied to the second extrude; or by the second process, which comprises the steps of melt-kneading the crystalline polyolefin resin ($A_1$) together with the rubber component ($B_1$) in a first extruder in the presence of the cross linking agent (D), supplying a kneaded mass of the crystalline polyolefin resin ($A_2$) and/or the rubber component ($B_2$) extruded from a second extruder to the first extruder at a position within the range of the exit-side half of the first extruder and melt-kneading the so-supplied kneaded mass ($A_2$ and/or $B_2$) therein together with the kneaded mass which has been subjected to the melt-kneading in the first extruder and in which the cross linking reaction has substantially been completed.

Now, the explanation is directed first to the first process for producing the thermoplastic elastomer according to the present invention. For the first extruder to be used in the first production process, conventional extruders permitting melt-kneading of the crystalline polyolefin ($A_1$) and the rubber component ($B_1$) in the presence of the cross linking agent (D) can be employed without any restriction. While it is permissible to use a monoaxial or biaxial extruder as the first extruder, use of a biaxial extruder is preferable, wherein special preference is given to a biaxial extruder having an L/D ratio (i.e. the ratio of the effective length L to the outer diameter D of the screw) of 30 or higher, preferably 36–54. For such a biaxial extruder, any type can be employed, for example, one in which both screws are rotated in the same direction, one in which both screws are rotated in opposite direction, one in which both screws are held in engagement with each other and one in which both screws are held without engagement. Among them, those in which both screws rotate in the same direction under engagement with each other are preferred. Concrete examples of such biaxial extruder include ZSK (trademark) of the firm Warner, TEM (trademark) of Toshiba Machine Co., Ltd., TEX (trademark) of The Japan Steel Works, Ltd., GT (trademark) of Ikegai Iron Works, Ltd. and KTX (trademark) of Kobe Steel, Ltd.

The second extruder to be used in the first production process is provided with a fitting for connecting the exit of the first extruder thereto so as to permit direct supply of the extruded mass from the first extruder to the second extruder. The connection fitting may favorably be located at a position within the range of the inlet-side ⅔ of the full length of the barrel of the second extruder, preferably in the range of inlet-side ⅕–½ of the full length of the barrel, namely, at a position closer to the feed hopper of the second extruder than the position of ½ of the full length of the barrel. The second extruder may either be monoaxial or biaxial or, further, of a type of high speed continuous kneader mixer, wherein biaxial extruder is preferred.

The first and the second extruder are provided usually with a feed hopper or a metering feeder for supplying the starting materials thereto.

In the context of the specification of the present invention, the designation of the "first" and the "second" extruder is used merely for the sake of convenience in order to discriminate the two extruders but not for the sake of limitation to the use of only two extruders. Thus, for example, in the case of using two or more polyolefin resins for the crystalline polyolefin resin (A), further extruder(s) may be installed before the first extruder, in order to effect a preliminary melt-kneading of them.

The first production process includes a step of cross linking by melt-kneading the crystalline polyolefin resin ($A_1$) together with the rubber component ($B_1$) in the presence of a cross linking agent (D) in the first extruder.

The crystalline polyolefin resin ($A_1$) and the rubber component ($B_1$) are supplied to the first extruder usually via a feed hopper or a metering feeder in a state not melted.

For supplying the cross linking agent (D) and the cross-linking assistant (E) to the first extruder, such a practice as to admix them preliminary to a pelletized starting polymer to be subjected to cross linking using a mixer or to guide them to the first extruder via an opening disposed in the barrel of the first extruder at a position between the feed hopper and the extrusion die thereof. In the case of the latter, the opening of the barrel may preferably be located in the upper reach (of the material flow in the extruder) from the position of ½ of the entire length of the barrel, preferably from the position of ⅔ (measured from the hopper-side end) of the barrel full length.

The cross linking reaction will be terminated before the kneaded mass is supplied to the second extruder, that is, the cross linking has substantially been completed within the first extruder. Therefore, it is preferable to settle the temperature of either one of barrel zones in which the cross linking reaction is proceeding, for example, a zone found between the supply inlet of the cross linking agent (D) and the extrusion die, at a temperature which is at least 20° C. preferably at least 30° C., higher than the one minute half-life temperature of the cross linking agent (D).

Whether or not the cross linking reaction has substantially been completed can be judged from the gel content difference (difference in the amount of cyclohexane-insoluble matter) defined by the following arithmetic equation (2):

$$\text{Gel content difference (mg)} = Q - rP \quad (2)$$

In the above equation, Q represents the amount (mg) of cyclohexane-insoluble matter contained in 100 mg sample of the finally obtained thermoplastic elastomer, P denotes the amount (mg) of cyclohexane-insoluble matter contained in 100 mg sample of the melt-kneaded mass supplied to the second extruder and r denotes the weight ratio of the amount of raw material fed to the first extruder versus the total sum of the feed amounts to the first and the second extruders.

When the gel content difference defined by the above equation (2) is less than 10 mg, one can judge that the cross linking reaction has substantially been completed. It is understood that the lower this difference is, the higher should be the degree of the cross linking reaction.

The amount of the cyclohexane-insoluble matter in each sample is determined in the following manner: A sample of 100 mg weighed amount is cut into minute dice of a size of 0.5 mm×0.5 mm×0.5 mm, which are then soaked in 30 ml of cyclohexane at 23° C. for 48 hours in a tightly sealed vessel. Then, the residue of the soaked sample is taken out and placed on a filter paper and dried at room temperature for a period of over 72 hours until a constant weight is reached. The amount of the above-mentioned cyclohexane-insoluble matter is determined by subtracting the weight of the cyclohexane-insoluble matter other than the polymeric substance from the weight of the dried residue.

In the first production process, the cross-linked product (C) in which the cross linking reaction has substantially been completed, namely, the melt-kneaded mass supplied to the second extruder from the first extruder, and the polymer portion not yet cross-linked, such as the starting materials supplied to the second extruder other than those in the first extruder, are subjected to melt-kneading in the second extruder in the region downstream from the position of introduction of the melt-kneaded mass from the first extruder therein to, whereby an elastomer composition in which the cross-linked product (C) and the non-cross-linked polymer portion are dispersed therein in a uniform distribution can be obtained.

The degree of cross linking of the cross-linked product (C) resulting from the cross linking reaction, namely, the degree of cross linking of the final elastomer composition, may favorably be such that the gel content a) (cyclohexane-insoluble matter) determined by the method given above is at least 20%, preferably at least 30% by weight. In case where a fastness to oils is required, the degree of cross linking may preferably be at least 90% by weight. It is to be pointed out that the thermoplastic elastomer according to the present invention exhibits an improved fastness to oils, even if the gel content is lower than 90% by weight, as compared with any conventional thermoplastic elastomer corresponding to that according to the present invention.

The shearing velocity upon the kneading on the first extruder according to the present invention should be at least 300 sec$^{-1}$, preferably at least 1,000 sec$^{-1}$ and most preferably at least 2,000 sec$^{-1}$.

The components ($A_2$) and/or ($B_2$) to be blended with the cross-linked product (C) according to the present invention may, in usual, be supplied to the second extruder in a non-molten state using a suitable feeding device, such as feed hopper or metering feeder, wherein it is preferable to supply it using a metering feeder in order to maintain the blending proportion relative to the kneaded mass from the first extruder at a constant value.

In the first production process, the kneaded mass from the first extruder in which the cross linking reaction has substantially been completed is supplied to the second extruder in order to subject it to a melt-kneading together with the crystalline polyolefin resin ($A_2$) and/or the rubber component ($B_2$) present in the second extruder. The kneaded mass supplied thereto from the first extruder may preferably be in a molten state. The kneaded mass from the first extruder may favorably be supplied to the second extruder at a position upstream from $2/3$ of the full length of the extruder barrel measured from the end of its feed hopper side, preferably within the range from $1/5$ to $1/2$ of the full length of the extruder barrel measured from the end of its feed hopper side. The melt-kneading temperature in the second extruder may favorably be in the range of 140–300° C., preferably in the range of 160–250° C.

The softening agent (F), the inorganic filler (G) and other additives may be introduced into the mass to be kneaded at any pertinent location without any special limitation and, for example, they may be supplied either to the first extruder or to the second extruder or, further, to both extruders.

Each component to be supplied to the first and second extruders may preferably be kneaded preliminary in a mixer, such as a Henschel mixer.

Now, the description shall be directed to the second production process. For the first extruder to be employed in the second production process, any extruder permitting melt-kneading of the crystalline polyolefin resin ($A_1$) and the rubber component ($B_1$) in the presence of a cross linking agent (D) can be used without any special limitation. As the first extruder, there may be employed, for example, a monoaxial or biaxial extruder, wherein preference is given to the use of a biaxial extruder, especially one which has an L/D ratio, namely, the ratio of the effective length L to the outer diameter D of the screw, of 35 or higher, preferably in the range of 40–60, more preferably in the range of 44–56. For such a biaxial extruder, every voluntary one can be employed, for example, one in which both the screws rotate in the same rotational direction or in the opposite direction or one in which both the scews are held in engagement with each other or held without engagement with each other. Among them, those in which both screws rotate in the same direction under engagement with each other are more preferred. Concrete examples of such a biaxial extruder include ZSK (trademark) of the firm Warner, TEM (trademark) of Toshiba Machine Co., Ltd., TEX (trademark) of The Japan Steel Works, Ltd., GT (trademark) of Ikegai Iron Works, Ltd. and KTX (trademark) of Kobe Steel, Ltd.

The first extruder is provided with a fitting for connecting the exit of the second extruder to the first extruder at a position within the range of the exit-side half of the first extruder barrel, in order to introduce the kneaded mass in the second extruder into the first extruder midway the kneading path therein. The second extruder may either be monoaxial or biaxial, wherein preference is given to a biaxial one in case where two or more species of polymers have to be supplied to the first extruder. The position of introduction of the kneaded mass from the second extruder into the first extruder may be within the range of the exit-side half of the kneading path in the first extruder and may preferably be within the range downstream the $3/5$ of the full length of the barrel measured from the die-side end thereof. Usually, the first extruder is provided with supply means for supplying the crystalline polyolefin resin ($A_1$) and the rubber component ($B_1$) and others, such as feed hopper, metering feeder and the like.

In the second production process, the first extruder is first supplied with the crystalline polyolefin resin ($A_1$) and the rubber component ($B_1$), whereupon they are melt-kneaded therein in the presence of a cross linking agent (D) to effect cross linking of them.

For supplying the cross linking agent (D) and the cross linking assistant (E), there may be employed, for example, techniques in which they are blended preliminary with the pelletized starting polymer products to be subjected to the cross linking reaction and the resulting mixture is fed to the first extruder; or in which they are supplied to the first extruder, separately from the polymer materials, via an opening arranged in the extruder barrel thereof upstream from the fitting for connection path from the second extruder. In the case of the latter, the opening of the extruder barrel may preferably be arranged on the barrel at a position upstream from the $3/5$ position of the full length of the barrel measured from the feed hopper-side end of the barrel.

The cross linking reaction should have been completed substantially before the new starting polymer materials are supplied, namely, before the kneaded mass has reached the position of the fitting for the connection path from the second extruder. Therefore, it is favorable to settle the temperature in the portion where the cross linking reaction takes place, such as for example, in either one barrel zone in the range from the position at which the cross linking agent (D) is supplied to the first extruder to the position at which the fitting for the connection path from the second extruder is disposed therein, at a temperature which is at least 20° C., preferably at least 30° C., higher than the one minute half-life temperature of the cross linking agent (D).

In the second production process, the cross-linked product (C) in which the cross linking reaction has substantially been completed is melt-kneaded together with the non-cross-linked polymer substances within the region in the first extruder downstream the location where the kneaded mass from the second extruder is introduced therein to to thereby build up an elastomeric composition in which the cross-linked product (C) and the non-cross-linked polymer molecules are present in a uniformly dispersed state.

As detailed above, the thermoplastic elastomer according to the present invention exhibits an improved oil-resistant property with scarce tendency of depositing gummy crust on the surfaces around the extrusion die upon extrusion molding thereof. The thermoplastic elastomer according to the present invention can find wide applications as an energy-sparing and resources-economizing elastomer, in particular, as a substitute for vulcanized rubber, for example, for parts and elements of automobiles and industrial machines, for electric and electronic devices and for architectural materials.

According to the first production process, a thermoplastic elastomer exhibiting an improved resistance to oils with scarce tendency of depositing gummy crust around the extrusion die upon extrusion molding thereof can be produced efficiently, by performing the process steps comprising melt-kneading a crystalline polyolefin resin and a rubber component in the presence of a cross linking agent in a first extruder, supplying the resulting kneaded mass, in which the cross linking reaction has substantially been completed, to a second extruder and subjecting the so-supplied kneaded mass therein to a melt-kneading together with a crystalline polyolefin resin and/or a rubber component each supplied to the second extruder.

According to the second production process, a thermoplastic elastomer exhibiting an improved resistance to oils with scarce tendency of depositing gummy crust around the extrusion die upon extrusion molding thereof can be produced efficiently, by performing the process steps comprising melt-kneading a crystalline polyolefin resin and a rubber component in the presence of a cross linking agent in a first extruder, supplying a kneaded mass of a crystalline polyolefin resin and/or a rubber component extruded from a second extruder to the first extruder at a position within the range of the exit-side half of the first extruder and melt-kneading the so-supplied kneaded mass therein together with the kneaded mass which has been subjected to the melt-kneading in the first extruder and in which the cross linking reaction has substantially been completed.

THE BEST MODE FOR EMBODYING THE INVENTION

Now, the present invention is described by embodiments shown in the Drawings appended.

An embodiment of the apparatus for producing the thermoplastic elastomer by the first production process is shown in FIG. 1 in a perspective view, in which the numeral 1 indicates the first extruder and 2 is the second extruder. The first extruder 1 is a biaxial extruder provided with a feed hopper 5 and an extrusion die 6 and is constructed in such a manner that the kneaded mass extruded from this die 6 is introduced into the second extruder 2 via a connection path 7 by the extrusion pressure.

The second extruder 2 is also a biaxial extruder equipped with a metering feeder 11 and an extrusion die 12, wherein the barrel 13 thereof is provided with a fitting 14 for connecting the extrusion outlet of the first extruder 1 to the second extruder 2 at a position of 3/10 of the full length of the barrel 13 measured from its feeder-side end. A connection path 7 connects the extrusion outlet of the first extruder 1 with the second extruder 2 by the fitting 14.

The first and the second extruders 1 and 2 are arranged in a parallel relation on nearly the same vertical level from the installation base plane.

For producing the thermoplastic elastomer according to the present invention using the apparatus shown in FIG. 1, the crystalline polyolefin resin ($A_1$), the rubber component ($B_1$), the cross linking agent (D) and additives to be incorporated as required are supplied in an adequate proportion to the first extruder 1 through the feed hopper 5 and are subjected to melt-kneading at a shearing velocity of at least 300 sec.$^{-1}$ to cause cross linking reaction. Here, the type of the extruder, set temperature for the melt-kneading, each specific cross linking agent (D) and the amount thereof to be used are selected adequately in such a manner that the cross linking reaction should have substantially been completed before the extruded kneaded mass is introduced into the second extruder. The kneaded mass (the cross-linked product (C)) extruded through the die 6 of the first extruder 1, in which the cross linking reaction has substantially been completed, is then transferred to the second extruder 2 via the connection path 7 by making use of the extrusion pressure of the first extruder 1. In the apparatus of FIG. 1, the substantial completion of the cross linking reaction of the kneaded mass in the first extruder before being extruded therefrom can easily be attained by a proper selection of the above-mentioned condition, since an individually constructed extruder is used for the first extruder 1.

In the second extruder 2, the crystalline polyolefin resin ($A_2$) and/or the rubber component ($B_2$) as well as the additives to be incorporated on requirement supplied via the metering feeder 11 are subjected to melt-kneading together with the kneaded mass which is extruded from the first extruder 1 and transferred to the second extruder via the connection path 7. The starting raw materials supplied to the second extruder 2 via the metering feeder 11 and the cross-linked product (C) extruded from the first extruder 1 and introduced into the second extruder 2 are processed together by melt-kneading in the second extruder 2 in the region downstream from the location of the fitting 14 for introducing the kneaded mass extruded from the first extruder 1 to thereby obtain the thermoplastic elastomer.

The kneaded mass extruded from the first extruder 1 is introduced into the second extruder 2 preferably in a molten state and, therefore, the connection path 7 may preferably be constituted of a metal pipe capable of maintaining the temperature of the extruded kneaded mass (the cross-linked product (C)) passing therethrough at least at its melting point. The so-obtained thermoplatic elastomer is extruded through the die 12.

Figure 2:
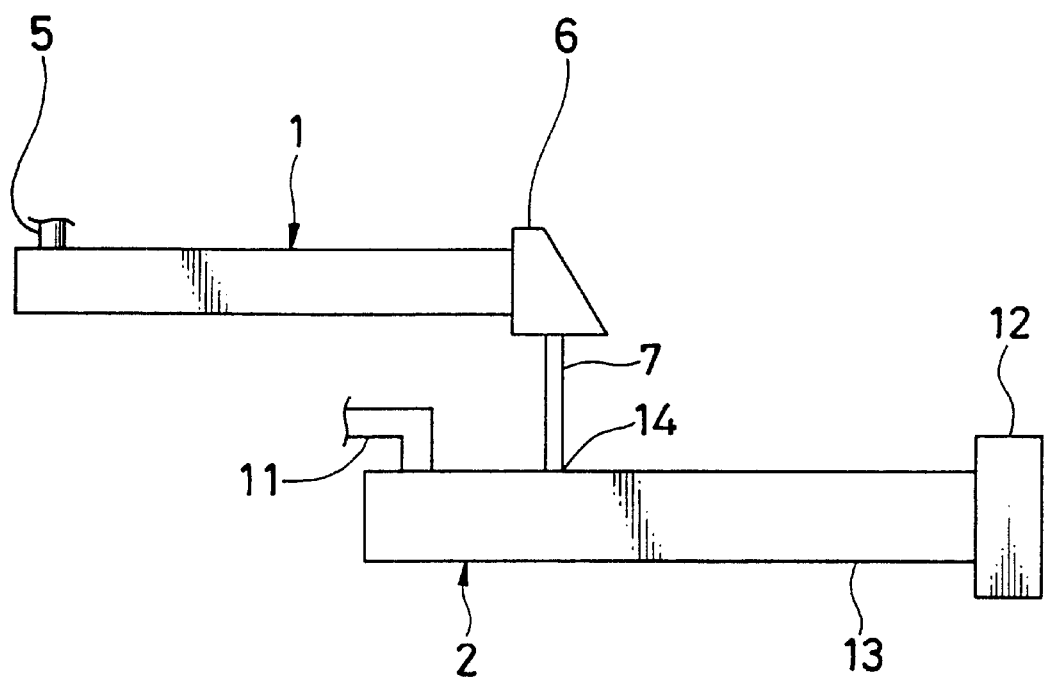
FIG. 2 shows a front view of an alternative apparatus for realizing the first process for producing the thermoplastic elastomer according to the present invention.

In FIG. 2, another arrangement of the apparatus for effecting the first production process is shown in a front view. This arrangement is constructed such that the first extruder 1 is disposed on a level higher than that of the second extruder 2, wherein the first extruder 1 serves for attaining substantial completion of the cross linking reaction to obtain the cross-linked product (C) which is extruded therefrom and transferred directly to the second extruder 2 via the connection path 7 by making use of the natural force of gravity. Other constructions are the same as in the apparatus of FIG. 1.

Also in the apparatus of FIG. 2, the thermo-plastic elastomer can be produced in the same manner as in the apparatus of FIG. 1 except that the extruded kneaded mass (the cross-linked product (C)) produced in the first extruder is transferred to the second extruder by making use of the force of gravity.

While the apparatuses of FIGS. 1 and 2 use a feed hopper 5 for supplying the cross linking agent (D) and optionally added additives, it is possible to arrange an opening in the extruder barrel between the feed hopper 5 and the extrusion die 6 for exclusive use for supplying these ingredients. It is permissible to use other type of extruder or a mixer kneader, such as a monoaxial extruder.or a high speed continuous kneader mixer, as the second extruder 2.

FIG. 3 shows an apparatus to be used for effecting the second production process according to the present invention in a perspective view. This apparatus comprises a first extruder 1 and a second extruder 2.

The first extruder 1 is constituted of a biaxial extruder having an L/D ratio of 35 or higher equipped with a feed hopper 5 and an extrusion die 6, wherein the extrusion outlet of the second extruder 2 is connected to the first extruder 1 by a fitting 9 at the location of 3/10 of the full length of the extruder barrel 8 of the first extruder 1 measured from the die-side end thereof. The second extruder 2 is constituted of a biaxial extruder constructed so as to effect a preliminary kneading of the other portion of the starting materials and to introduce the so-kneaded mixture into the melt-kneaded mass in the first extruder 1 at a proper location thereof via a connection path 16 fitted by the fitting 9.

For producing the thermoplastic elastomer using the apparatus of FIG. 3, the crystalline polyolefin resin ($A_1$), the rubber component ($B_1$), the cross linking agent (D) and additives to be incorporated as required are supplied to the first extruder 1 via the feed hopper 5, in order to process them in the first extruder by melt-kneading them to cause cross linking of the kneaded mass. Here, the type of the extruder, settled temperature for the melt-kneading, each specific cross linking agent (D) and the amount thereof to be used are selected adequately in such a manner that the cross linking reaction should have substantially been completed before the extruded kneaded mass from the second extruder 2 is introduced hereinto.

In the apparatus of FIG. 3, the substantial completion of the cross linking reaction of the kneaded mass in the first extruder before the introduction of the extruded kneaded mass from the second extruder can easily be attained by a proper selection of the above-mentioned conditions, since the connection path 16 for introducing the kneaded mass from the second extruder 2 is disposed on the extrusion barrel 8 of the first extruder 1 at a position within the range of downstream-side half thereof.

The second extruder 2 is supplied, via the feed hopper 15, with the crystalline polyolefin resin ($A_2$) and/or the rubber component ($B_2$) as well as other additives to be incorporated if required, in order to effect preliminary kneading of them, before the resulting kneaded mass extruded therefrom is transferred to the first extruder 1 via the connection path 16 at a position at which the cross linking reaction of the melt-kneaded mass in the first extruder 1 has substantially been completed, so as to subject the so-transferred kneaded mass to the melt-kneading in the first extruder 1 together with the melt kneaded mass existing in the first ectruder 1. The melt-kneaded mass which has been cross-linked in the first extruder 1 and the additionally introduced kneaded mass of the starting materials from the second extruder 2 are subjected to a further melt-kneading in the range in the first extruder 1 downstream from the position 9 of introduction of the kneaded mass from the second extruder 2, whereby the contemplated thermoplastic elastomer can be obtained, which is extruded from the extrusion die 6.

While the apparatus of FIG. 3 uses a feed hopper 5 for supplying the cross linking agent (D) and the optionally added additives, it is possible to arrange an opening in the extruder barrel 8 at a position between the feed hopper 5 and the connection path 16 for exclusive use for supplying these ingredients. It is permissible to use other type of extruder or a mixer kneader, such as a monoaxial extruder or a high speed continuous kneader mixer, as the second extruder 2.

EXAMPLES

Below, the present invention will further be described in more detail by way of Examples, wherein these Examples should not be regarded as limiting the present invention in any sense. In the description of Examples, the gel content, the oil-resistance expressed by ΔW and the amount of deposition of gummy crust are recited each in a value obtained by the procedures explained previously. The feed components employed for these Examples are as follows:

| <The Crystalline Polyolefin Resin (A)> | |
|---|---|
| (A-1) | A homopolymer of propylene with an MFR of 15 g/10 min. |
| (A-2) | A homopolymer of propylene with an MFR of 1.0 g/10 min. |
| (A-3) | A homopolymer of 1-butene with an MFR of 0.7 g/10 min. |
| (A-4) | A random copolymer of ethylene/4-methyl-1-pentene having a density of 0.920 g/cm$^3$, an ethylene content of 97 mole % and an MFR of 3.6 g/10 min. |
| (A-5) | A homopolymer of propylene having an MFR of 25 g/10 min. |
| (A-6) | A homopolymer of propylene having an MFR of 0.5 g/10 min. |
| (A-7) | A homopolymer of 1-butene having an MFR of 1.5 g/10 min. |
| (A-8) | A random copolymer of ethylene/4-methyl-1-pentene having a density of 0.920 g/cm$^3$, an ethylene content of 97 mole % and an MFR of 2.0 g/10 min. |
| <The Rubber Component (B)> | |
| (B-1) | An oil-extended product extended with 40 parts by weight of an oil (extender oil: DYNAPROCESS OIL PW-380 (trademark) of Idemitsu Kosan Co., Ltd,) per 100 parts by weight of a copolymer rubber of ethylene/propylene/5-ethylidene-2-norbornene having an ethylene content, based on the total sum of ethylene and propylene, of 80 mole %, an iodine value of 12 and an MFR of 0.2 g/10 min. |
| (B-2) | A butyl rubber with an unsaturation degree of 0.7 mole % and an MFR of 0.6 g/10 min. |
| (B-3) | A hydrogenation product of styrene/isoprene block copolymer having a styrene content of 30% by weight, an MFR of 2.0 g/10 min. and a hydrogenation degree of 90% |
| (B-4) | An ethylene/1-butene copolymer with an ethylene content of 81 mole % and an MFR of 0.5 g/10 min. |
| (B-5) | An ethylene/propylene copolymer with an ethylene content of 41 mole % and an MFR of 0.4 g/10 min. |
| (B-6) | An oil-extended product extended with 40 parts by weight of an oil (extender oil: DYNAPROCESS OIL PW-380 (trademark) of Idemitsu Kosan Co., Ltd.) per 100 parts by weight of an ethylene/propylene/5-ethylidene-2-norbornene copolymer rubber having an ethylene content, based on the total sum of ethylene and propylene, of 78 mole %, an iodine value of 14 and an MFR of 0.2 g/10 min. |
| (B-7) | An ethylene/1-butene copolymer having an ethylene content of 81 mole % and an MFR of 0.7 g/10 min. |
| <The Cross Linking Agent (D) > | |
| (D-1) | 2,5-dimethyl-2,5-di(tert-butylperoxy)hexane with a one minute half-life temperature of 179° C. |
| <The Cross Linking Assistant (E) > | |
| (E-1) | Divinylbenzene |
| <The Softening Agent (F) > | |
| (F-1) | A paraffinic process oil (DYNAPROCESS OIL PW-380 (trademark) of Idemitsu Kosan Co., Ltd.) |

Example 1

A thermoplastic elastomer was produced using the apparatus of FIG. 1. Namely, 20 parts by weight of the pelletized product of above (A-1) as the crystalline polyolefin resin ($A_1$), 80 parts by weight of the pelletized product of above (B-1) as the rubber component ($B_1$), 0.4 part by weight of the cross linking agent of above (D-1) and 0.4 part by weight of the cross linking assistant of above (E-1) were mixed on a Henschel mixer and the resulting mixture was supplied to the first extruder 1 (a biaxial extruder having a screw diameter of 30 mm, an L/D ratio of 40 and temperature controllable 6 zones in the barrel 8) via the feed hopper 5, in order to subject the mixture to cross linking reaction. The shearing velocity therein was 2,400 sec.$^{-1}$. The temperatures of the 6 zones (C1 to C6 disposed in order from the side of the feed hopper 5) in the extruder barrel 8 and of the die 6 (D) were settled as follows:

Set temperatures (° C.) for C1/C2/C3/C4/C5/C6/D=160/160/180/210/230/230/220

The melt-kneaded cross-linked mass extruded from the first extruder 1 via the die 6 was then introduced directly into the second extruder 2 (a biaxial extruder having a screw diameter of 30 mm, an L/D ratio of 32 and temperature controllable 6 zones in the barrel 13). The connection path 7 from the first extruder is joined to the second extruder 2 at a position of 2/7 of the full length of the barrel 13 of the second extruder 2 measured from its feeder-side end, namely, upstream from the ½ position of the full length of the barrel 13.

Besides the introduction of the melt-kneaded mass as above, the second extruder 2 was supplied with the propylene homopolymer (A-2) as the crystalline polyolefin resin (A$_2$) via a metering feeder so as to melt-knead it together with the above-mentioned melt-kneaded mass introduced therein to. The amount of the propylene homopolymer (A-2) supplied was 20 parts by weight per 100 parts by weight of the starting polymer materials supplied to the first extruder via the feed hopper 5. In this way, the thermoplastic elastomer was produced.

A pelletized product of the so-obtained thermoplastic elastomer was processed into a rectangular sheet of a size of 150 mm×120 mm×2 mm by injection molding, from which a test piece of a size of 20 mm×20 mm×2 mm was cut out in order to estimate the oil-resistance (degree of swell) by an oil-swell test. The oil-swell test was carried out by immersing the test piece, which had been weighed preliminary, in a paraffin oil at 50° C. for 24 hours and the so-treated test piece was weighed, in order to determine the weight difference ΔW before and after the oil immersion. The test results are recited in Table 1.

On the other hand, the thermoplastic elastomer obtained as above was processed on a monoaxial extruder having a full fight screw of a diameter of 50 mm, an L/D ratio of 28 and a compression ratio of 4.0 by extruding through a die having an extrusion aperture of 25 mm×1 mm under a gradient temperature elevation from 160° C. to 210° C. from the supply inlet to the die outlet of the monoaxial extruder at an extrusion rate of 20 m/min. to produce a ribbon, wherein the amount of gummy crust deposited around the die within an interval of 10 minutes was observed. Here, the gradient temperature elevation was realized under the following temperature conditions for the barrel zones (C1) to (C4), the head (H) and the die (D):

Set temperatures (° C.) for C1/C2/C3/C4/H/D =

160/170/180/190/200/210

The gel content was also determined using the equation (1) given previously. The results are recited in Table 1.

Examples 2–8 and Comparative Examples 1–3

Thermoplastic elastomers were produced with blend compositions as given in Table 1 and were tested in the same way as in Example 1. The results are recited in Table 1.

Example 9

A thermoplastic elastomer was produced and tested in the same manner as in Example 1 except that a liquid mixture of the feed components (D-1), (E-1) and (F-1) in the proportion as given in Table 1 was supplied to the first extruder 1 by pumping it into an opening disposed on the barrel 8 of the first extruder 1 at a position of 2/7 of the full length of the barrel 8 measured from the barrel end on the side of feed hopper 5. The test results are recited in Table 1.

TABLE 1

Blending proportion of the feed components in part by weight and test results

| Feed component and testing | Example | | | | | | |
|---|---|---|---|---|---|---|---|
| | 1 | 2 | 3 | 4 | 5 | 6 | 7 |
| (A-1)[1] | 20 | 20 | 20 | 20 | 20 | 20 | 40 |
| (A-2)[1] | — | — | — | — | — | — | — |
| (B-1)[1] | 80 | 80 | 80 | 60 | 60 | 80 | 60 |
| (B-2)[1] | — | — | — | 20 | — | — | — |
| (B-3)[1] | — | — | — | — | 20 | — | — |
| (D-1)[1] | 0.4 | 0.4 | 0.4 | 0.4 | 0.4 | 0.4 | 0.4 |
| (E-1)[1] | 0.4 | 0.4 | 0.4 | 0.4 | 0.4 | 0.4 | 0.4 |
| (A-2)[2] | 25 | — | — | 25 | 25 | 20 | 50 |
| (A-3)[2] | — | 25 | — | — | — | — | — |
| (A-4)[2] | — | — | 25 | — | — | — | — |
| (B-4)[2] | — | — | — | — | — | 20 | — |
| (B-5)[2] | — | — | — | — | — | — | 50 |
| (D-1)[3] | — | — | — | — | — | — | — |
| (E-1)[3] | — | — | — | — | — | — | — |
| (F-1)[3] | — | — | — | — | — | — | — |
| Gel cont.[4] | 98 | 98 | 98 | 83 | 88 | 87 | 74 |
| Δ W[5] | 17 | 20 | 21 | 19 | 18 | 27 | 38 |
| Gummy cr.[6] | 15 | 20 | 17 | 11 | 18 | 10 | 8 |

| Feed component and testing | Example | | Comp. Example | | |
|---|---|---|---|---|---|
| | 8 | 9 | 1 | 2 | 3 |
| (A-1)[1] | 20 | 20 | 20 | 16 | 20 |
| (A-2)[1] | — | — | — | 20 | — |
| (B-1)[1] | 80 | 80 | 80 | 64 | 80 |
| (B-2)[1] | — | — | — | — | — |
| (B-3)[1] | — | — | — | — | — |
| (D-1)[1] | 0.4 | — | 0.4 | 0.24 | — |
| (E-1)[1] | 0.4 | — | 0.4 | 0.32 | — |
| (A-2)[2] | — | 25 | — | — | 25 |
| (A-3)[2] | — | — | — | — | — |
| (A-4)[2] | — | — | — | — | — |
| (B-4)[2] | — | — | — | — | — |
| (B-5)[2] | 40 | — | — | — | — |
| (D-1)[3] | — | 0.4 | — | — | — |
| (E-1)[3] | — | 0.4 | — | — | — |
| (F-1)[3] | — | 5 | — | — | — |
| Gel cont.[4] | 71 | 98 | 98 | 98 | — |
| Δ W[5] | 44 | 16 | 27 | 25 | >100 |
| Gummy cr.[6] | 13 | 17 | 60 | 57 | 3 |

Notes:
[1] Supplied to the first extruder 1 via feed hopper 5
[2] Supplied to the second extruder 2 via metering feeder
[3] Supplied to the first extruder 1 via an opening disposed on the extruder barrel 8 at a position of 2/7 of the full length of the barrel 8 measured from the barrel end on the side of the feed hopper
[4] Gel content in weight % determined using the equation (1)
[5] Oil-resistance expressed by the weight difference Δ W of test piece in weight % before and after immersion in paraffin oil
[6] Weight of the deposited gummy crust in mg Example 10

Thermoplastic elastomers were produced using an apparatus corresponding to that shown in FIG. 3. Thus, 20 parts by weight of a pelletized product of the feed component (A-5) as the crystalline polyolefin resin (A$_1$), 80 parts by weight of a pelletized product of the feed component (B-6) as the rubber component (B$_1$), 0.3 part by weight of the cross linking agent (D-1) and 0.4 parts by weight of the cross linking assistant (E-1) were blended on a Henschel mixer and the resulting mixture was supplied to the first extruder 1 (a biaxial extruder having a screw diameter of 53 mm, an L/D ratio of 45 and temperature-controllable 12 zones in the extruder barrel 8) via the feed hopper 5, in order to cause cross linking reaction of the polymer materials supplied thereto. The shearing velocity therein was 2,500 sec.$^{-1}$. The temperatures of the 12 zones (C1 to C12 arranged in order from the feed hopper-side) in the extruder barrel 8 and of the die 6 (D) were settled as follows:

Set temperatures (° C.) for C1/C2/C3/C4/C5/C6/C7/C8/C9/C10/ C11/C12/D=160/160/170/180/200/220/230/230/200/200/200/ 200/200

A preliminarily mixed mass of the homopolymer of propylene (A-6) as the crystalline polyolefin resin ($A_2$) was supplied from the second extruder 2 (a biaxial extruder having a screw diameter of 30 mm, an L/D ratio of 32 and an evenly settled extruder internal temperature of 220° C.) to the first extruder 1 via the connection path 16 at a position of 4/13 of the full length of the barrel 8 measured from the die-side end of the barrel 8 (namely, downstream from the position of ½ of the barrel full length). The supply rate of the propylene homopolymer was chosen to be 20 parts by weight per 100 parts by weight of the polymer materials supplied to the first extruder 1 via the feed hopper 5. The so-obtained thermoplastic elastomer was tested in the same manner as in Example 1, wherein the test results as recited in Table 2 were obtained.

Examples 11–17 and Comparative Examples 4–6

In the same manner as in Example 10, thermoplastic elastomers were poured with varying blending, proportions of the feed components as given in Table 2, for which tests were carried out in the same manner as in Example 1. The test results are given in Table 2.

Example 18

A thermoplastic elastomer was produced and tested in the same manner as in Example 10, except that a liquid mixture of the feed components of (D-1), (E-1) and (F-1) in the proportion as given in Table 2 was supplied to the first extruder by pumping it into a barrel opening disposed on the barrel 8 of the first extruder at a position of 10/13 of the full length of the barrel 8 measured from the die-side end of the barrel 8. The test results are recited also in Table 2.

Comparative Example 7

A thermoplastic elastomer was produced and tested in the same manner as in Example 10, except that the junction position of the connection path from the second extruder 2 (a biaxial extruder having a screw diameter of 30 mm, an L/D ratio of 32 and an evenly settled extruder internal temperature of 220° C.) on the extruder barrel 8 of the first extruder 1 wears settled at a position of 9/13 of the full length of the barrel 8 measured from the die-side end of the barrel 8 (namely, upstream from the position of ½ of the length of the barrel 8) and that the blending proportion of the feed components was changed to that given in Table 2. The test results are also given in Table 2.

TABLE 2

Blending proportion of the feed components in part by weight and test results

| Feed component and testing | Example | | | | | | |
|---|---|---|---|---|---|---|---|
| | 10 | 11 | 12 | 13 | 14 | 15 | 16 |
| (A-5)[1] | 20 | 20 | 20 | 20 | 20 | 20 | 40 |
| (A-6)[1] | — | — | — | — | — | — | — |
| (B-6)[1] | 80 | 80 | 80 | 60 | 60 | 80 | 60 |
| (B-2)[1] | — | — | — | 20 | — | — | — |

TABLE 2-continued

Blending proportion of the feed components in part by weight and test results

| (B-3)[1] | — | — | — | — | 20 | — | — |
|---|---|---|---|---|---|---|---|
| (D-1)[1] | 0.3 | 0.3 | 0.3 | 0.3 | 0.3 | 0.3 | 0.3 |
| (E-1)[1] | 0.4 | 0.4 | 0.4 | 0.4 | 0.4 | 0.4 | 0.4 |
| (A-6)[2] | 20 | — | — | 20 | 20 | 20 | 50 |
| (A-7)[2] | — | 20 | — | — | — | — | — |
| (A-8)[2] | — | — | 20 | — | — | — | — |
| (B-7)[2] | — | — | — | — | — | 20 | — |
| (B-5)[2] | — | — | — | — | — | — | 50 |
| (D-1)[3] | — | — | — | — | — | — | — |
| (E-1)[3] | — | — | — | — | — | — | — |
| (F-1)[3] | — | — | — | — | — | — | — |
| Gel cont.[4] | 98 | 98 | 98 | 80 | 86 | 84 | 72 |
| Δ W[5] | 19 | 22 | 23 | 20 | 18 | 29 | 39 |
| Gummy cr.[6] | 12 | 17 | 15 | 10 | 15 | 10 | 8 |

| Feed component and testing | Example | | Comparative Example | | | |
|---|---|---|---|---|---|---|
| | 17 | 18 | 4 | 5 | 6 | 7 |
| (A-5)[1] | 20 | 20 | 20 | 16.7 | 20 | 20 |
| (A-6)[1] | — | — | — | 16.7 | — | — |
| (B-6)[1] | 80 | 80 | 80 | 66.6 | 80 | 80 |
| (B-2)[1] | — | — | — | — | — | — |
| (B-3)[1] | — | — | — | — | — | — |
| (D-1)[1] | 0.3 | — | 0.3 | 0.25 | — | 0.3 |
| (E-1)[1] | 0.4 | — | 0.4 | 0.33 | — | 0.4 |
| (A-6)[2] | — | 20 | — | — | 20 | 20 |
| (A-7)[2] | — | — | — | — | — | — |
| (A-8)[2] | — | — | — | — | — | — |
| (B-7)[2] | — | — | — | — | — | — |
| (B-5)[2] | 40 | — | — | — | — | — |
| (D-1)[3] | — | 0.3 | — | — | — | — |
| (E-1)[3] | — | 0.4 | — | — | — | — |
| (F-1)[3] | — | 5 | — | — | — | — |
| Gel cont.[4] | 69 | 97 | 98 | 97 | — | 97 |
| Δ W[5] | 48 | 17 | 29 | 27 | >100 | 24 |
| Gummy cr.[6] | 10 | 14 | 52 | 49 | 4 | 46 |

Notes:
[1] Supplied to the first extruder 1 via feed hopper
[2] Supplied from the second extruder 2 to the first extruder (in Comparative Example 7, supplied at a point of 9/13 of the full length of the barrel of the first extruder measured from the die-side end of the barrel; in others, supplied at a point of 4/13 of the full length of the barrel of the first extruder measured from the die-side end of the barrel)
[3] Supplied to the first extruder 1 using a pump via an opening disposed on the extruder barrel 8 at a position of 10/13 of the full length of the barrel measured from the die-side end of the barrel
[4] Gel content in weight % determined using the equation (1)
[5] Oil-resistance expressed by the weight difference Δ W of test piece in weight % before and after immersion in paraffin oil
[6] Weight of the deposited gummy crust in mg From the results of Tables 1 and 2, it is recognized that the thermoplastic elastomer according to the present invention is superior in the resistance to oils with reduced deposition of gummy crust around the extrusion die.

What is claimed is:
1. A thermoplastic elastomer comprising (A) a crystalline polyolefin resin and (B) a cross-linked rubber component, which has
   a) a gel content expressed as a cyclohexane-insoluble matter after having been soaked in cyclohexane at 23° C. for 48 hours of at least 20% by weight,
   b) a weight change range ΔW after having been soaked in paraffin oil at 50° C. for 24 hours amounting to 80% by weight or lower and
   c) a rate of gummy crust deposition of 30 mg or less within an interval of 10 minutes occuring around the extrusion die upon extrusion of the elastomer into a ribbon on a monoaxial extruder provided with a full-flight extrusion screw having a diameter of 50 mm, an L/D ratio of 28 and a compression ratio of 4.0 through an extrusion die having an extrusion aperture of 25 mm×1 mm under a gradient temperature elevation from the extruder supply inlet to the die outlet of 160–210° C. at an extrusion rate of 20 m/min.

2. A thermoplastic elastomer as claimed in claim 1, which comprises, on the one hand, a cross-linked product (C) in which a rubber component ($B_1$) is cross-linked in a state mixed with a crystalline polyolefin resin ($A_1$) and, on the other hand, a crystalline polyolefin resin ($A_2$) and/or a rubber component ($B_2$).

3. A thermoplastic elastomer as claimed in claim 2, wherein the cross-linked product (C) comprises 5–70 parts by weight of the crystalline polyolefin resin ($A_1$) and 30–95 parts by weight of the rubber component ($B_1$) per 100 parts by weight of the total sum of ($A_1$) and ($B_1$) constituting the cross-linked product (C).

4. A thermoplastic elastomer as claimed in claim 2 or 3, which comprises 3–100 parts by weight of the crystalline polyolefin resin ($A_2$) and/or the rubber component ($B_2$) per 100 parts by weight of the total sum of ($A_1$) and (B) constituting the cross-linked product (C).

5. A process for producing a thermoplastic elastomer comprising (A) a crystalline polyolefin resin and (B) a cross-linked rubber component, comprising the steps of melt-kneading a crystalline polyolefin resin ($A_1$) together with a rubber component ($B_1$) in the presence of a cross linking agent (D) in a first extruder, supplying the resulting kneaded mass in which the cross linking reaction has substantially been completed to a second extruder and melt-kneading the so-supplied kneaded mass therein together with a crystalline polyolefin resin ($A_2$) and/or a rubber component ($B_2$) each supplied to the second extruder.

6. A process for producing a thermoplastic elastomer comprising (A) a crystalline polyolefin resin and (B) a cross-linked rubber component, comprising the steps of melt-kneading a crystalline polyolefin resin ($A_1$) together with a rubber component ($B_1$) in the presence of a cross linking agent (D) in a first extruder, supplying a kneaded mass of a crystalline polyolefin resin ($A_2$) and/or a rubber component ($B_2$) extruded from a second extruder to the first extruder at a position within the range of the exit-side half of the first extruder and melt-kneading the so-supplied kneaded mass ($A_2$ and/or $B_2$) therein together with the kneaded mass which has been subjected to the melt-kneading in the first extruder and in which the cross linking reaction has substantially been completed.

7. The thermoplastic elastomer according to claim 3, wherein the crystalline polyolefin resin ($A_1$) comprises a homopolymer of ethylene, propylene, or 1-butene or a copolymer comprised of two or more of ethylene, propylene and 1-butene.

8. The thermoplastic elastomer according to claim 3, wherein the crystalline polyolefin resin ($A_1$) comprises a propylene homopolymer or a copolymer of propylene having a propylene content of at least 85 mole percent, with a comonomer which is ethylene or an alpha-olefin having from 4 to 10 carbon atoms.

9. The thermoplastic elastomer according to claim 8, wherein the proportion of crystalline polyolefin resin ($A_1$) is in the range of from 10–50 parts, by weight, per 100 parts by weight of components ($A_1$) and ($B_1$).

10. The thermoplastic elastomer according to claim 2, wherein the crystalline polyolefin resin ($A_2$) is present.

11. The thermoplastic elastomer according to claim 2, wherein the rubber component ($B_2$) is present.

12. The thermoplastic elastomer according to claim 2, wherein the crystalline polyolefin resin ($A_2$) and the rubber component ($B_2$) are both present.

\* \* \* \* \*

UNITED STATES PATENT AND TRADEMARK OFFICE
CERTIFICATE OF CORRECTION

PATENT NO.    : 6,610,786 B1
DATED         : August 26, 2003
INVENTOR(S)   : Yuichi Itoh et al.

It is certified that error appears in the above-identified patent and that said Letters Patent is hereby corrected as shown below:

Column 21,
Line 20, delete "(B)", insert -- ($B_1$) --.

Signed and Sealed this

Twenty-eighth Day of October, 2003

JAMES E. ROGAN
*Director of the United States Patent and Trademark Office*